2,928,876

CONDENSATION PRODUCTS OF N-SUBSTI-TUTED DIALKYLENETRIAMINES AND OR-THOHYDROXY AROMATIC CARBONYLS

John D. Spivack, Spring Valley, N.Y., and Harry Kroll, Warwick, R.I., assignors to Geigy Chemical Corporation, Ardsley, N.Y., a corporation of Delaware No Drawing. Application March 12, 1958
Serial No. 720,822

8 Claims. (Cl. 260—566)

This invention relates to new chemical compounds and more particularly to condensation products of substituted dialkylenetriamines and orthohydroxy aromatic carbonyls.

It is known that many organic products tend to oxidize and deteriorate in the presence of oxygen. Frequently such organic products become contaminated with, or come into contact with metals and metal compounds which accelerate or catalyze the oxidation and deterioration of such organic materials. The inhibition of such metal catalyzed oxidation is of particular importance in the production, storage and use of gasoline and other fuels, rubber products, vegetable oils, natural and synthetic resins and plastics, lubricating oils and greases, saturated and unsaturated hydrocarbons etc.

Metal catalyzed oxidation has been inhibited to a degree in the case of certain metals, particularly copper, by the use of condensation products of certain amines with certain ketones and aldehydes of the Schiff base type. Certain compounds of the Schiff base type, particularly those derived from alkylene diamines and orthohydroxy aromatic aldehydes, as disclosed in U.S. Patent 2,181,121, are effective in inhibiting the catalytic effect of copper and its compounds but are ineffective in deactivating the catalytic effect of other metals, such as iron, cobalt and manganese.

It has been found in particular, according to Chalk and Smith (Nature, vol. 174, page 802 (1954), that a common copper deactivator such as N,N'-bis-(salicylidene)-ethylenediamine, which is disclosed in the above mentioned U.S. patent, acts as an oxidation promoter in the presence of iron in cyclohexene solution. Similar observations were also made in the case of cobalt.

It has often been stated that in rubber the combined contamination by copper and iron compounds is more potent in producing ageing than the sum of the effects of copper and iron alone. Pederson, Ind. Eng. Chem., vol. 41, page 928 (1949), points out that the disalicylidene Schiff base of 1,2-diamino-propane, one of the compounds described in U.S. Patent 2,181,121 which is mentioned above, is actually an oxidation promoter and acts as metal activator in cracked gasoline in the presence of manganese, iron and cobalt. It is thus apparent that while many compounds of the Schiff base type may form metal chelates and may bind metals, this is not sufficient to guarantee a priori that such compounds are effective metal deactivators in preventing catalytic oxidative deterioration of various organic materials subject to such deterioration.

Surprisingly it has now been found that a new class of compounds of the Schiff base type is particularly effective for suppressing the catalytic activity of many metals with which oxidizable organic products are ordinarily brought into contact. The compounds according to the present invention are effective metal deactivators not only for one specific catalytic metal, such as iron, copper, cobalt, nickel or manganese, but for more than one of said catalytic metals.

They can be represented by the following general formula:

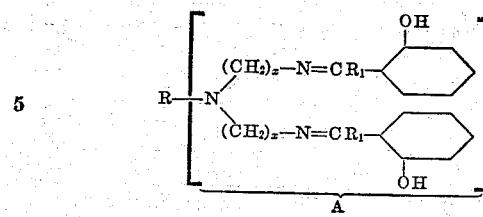

wherein

R represents an alkyl, preferably having from 1–12 carbon atoms, phenyl or lower alkylene–A group,
$R_1$ represents hydrogen or a lower alkyl group, and
$x$ represents an integer from 2 to 3 inclusive.

The new compounds can be prepared by condensing substituted dialkylenetriamines, in which the central or bridge nitrogen atoms are tertiary, of the general formula:

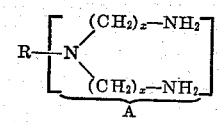

wherein R and $x$ have the meanings given above, with orthohydroxy aromatic carbonyls, i.e. with aldehydes or ketones of the general formula:

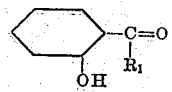

wherein $R_1$ has the meaning given above.

The following amines illustrate dialkylenetriamines usable in the process for the production of the new condensation products according to the present invention:

bis-N,N-(2-aminoethyl)-methylamine,
bis-N,N-(3-aminopropyl)-methylamine,
bis-N,N-(2-aminoethyl)-ethylamine,
bis-N,N-(3-aminopropyl)-ethylamine,
bis-N,N-(2-aminoethyl)-propylamine,
bis-N,N-(3-aminopropyl)-propylamine,
bis-N,N-(2-aminoethyl)-butylamine,
bis-N,N-(3-aminopropyl)-butylamine,
bis-N,N-(2-aminoethyl)-2-ethylhexylamine,
bis-N,N-(2-aminoethyl)-aniline,
bis-N,N-(2-aminoethyl)-dodecylamine,
bis-N,N-(3-aminopropyl)-dodecylamine,
bis-N,N-(2-aminoethyl)-p-anisidine,
bis-N,N-(3-aminopropyl)-p-anisidine,
bis-N,N-(2-aminoethyl)-o-aminophenol,
bis-N,N-(3-aminopropyl)-o-aminophenol,
tetrakis-N,N,N',N'-(2-aminoethyl)-ethylenediamine,
tetrakis-N,N,N',N'-(3 - aminopropyl) - ethylenediamine, etc.

Examples of aldehydes and ketones of the above mentioned formula are e.g.: salicylaldehyde, ortho-vanillin, o-hydroxyacetophenone, etc.

The preferred compounds of this invention are those derived from salicylaldehyde and o-hydroxyacetophenone.

Some of the condensation products of this invention are crystalline, but others are reddish, reddish-brown, orange or orange-brown oils. The compounds are insoluble in water but soluble in organic solvents, such as benzene, methanol, acetone, gasoline, kerosene and lubricating oils. The compounds form water-soluble alkali metal salts.

The following examples illustrate the invention without limiting it in any way. When not otherwise stated, parts are given as parts by weight and the temperatures are in degrees centrigade. The relationshtip of parts by weight to parts by volume is as that of kilogrammes to litres.

*Example I.* — *N,N,N',N'-tetrakis-(salicylidene-2-aminoethyl)-ethylenediamine*

2.9 parts of N,N,N',N'-tetrakis-(2-aminoethyl)-ethylenediamine (0.0125 mole) are dissolved in 50 parts by volume of isopropanol. To this solution is added an isopropanol solution of salicylaldehyde (6.1 parts, 0.05 mole, dissolved in 10 parts by volume of isopropanol), whereupon heat evolves and the tetrasalicylidene Schiff base begins to crystallize. The isopropanol reaction mixture is then heated to boiling to complete reaction and the product is allowed to crystallize upon cooling to room temperature. Yellow crystals (7.6 parts) which melt at 89° to 90° are obtained. They are soluble in benzene, kerosene, gasoline, methanol and acetone.

Basic nitrogen equivalent weight found _____ 130.0
Calculated for $C_{38}H_{44}N_6O_4$ (which is pentabasic) _ 129.5

*Example II.* — *N,N,N',N'-tetrakis-(salicylidene-3-aminopropyl)-ethylenediamine*

0.85 part of N,N,N',N'-tetrakis-(3-aminopropyl)-ethylenediamine pentahydrochloride (0.0018 mole) is dissolved in 10 parts by volume of methanol and 0.5 part of sodium methylate is added. The precipitated sodium chloride is filtered off. 0.88 part of salicylaldehyde (0.0072 mole) is added to the methanol solution and the mixture is heated in the water bath at 100°. The methanol solution is then evaporated to dryness at 1 mm. Hg pressure to remove traces of methanol and unreacted salicylaldehyde. The residual reddish oil (7.5 parts) shows by analysis to be N,N,N',N'-tetrakis-(salicylidene-3-aminopropyl)-ethylenediamine. The product is soluble in benzene, kerosen, gasoline, methanol, isopropanol and acetone.

*Example III.* — *N,N-bis-(salicylidene-2-aminoethyl)-methylamine*

10.4 parts of salicylaldehyde (0.085 mole) are added to 5 parts of N,N-bis-(2-aminoethyl)-methylamine (ca. 0.0425 mole), dissolved in 50 parts by volume of isopropanol, and the mixture is heated on the steam bath for 2 hours. The bulk of solvent is then removed by distillation at 15 mm. Hg pressure and the unreacted salicylaldehyde, amine and traces of isopropanol are removed in the water bath at 1.5 mm. Hg pressure. The residual reddish brown oil (13.5 parts) is soluble in benzene, kerosene, gasoline, methanol, isopropanol and acetone.

Basic nitrogen equivalent weight found _____ 109.5
Calculated for $C_{19}H_{23}N_3O_2$ _____ 108.3

*Example IV.* — *N,N-bis-(salicylidene-3-aminopropyl)-methylamine*

11.3 parts of N,N-bis-(3-aminopropyl)-methylamine (75%; 0.058 mole) are dissolved in 100 parts by volume of methanol and 13.2 parts of salicylaldehyde (0.108 mole) are added. The solution becomes reddish orange and is heated on the steam bath for about 1 hour and finally evaporated to dryness. The residual oil is then dissolved in 100 parts by volume of benzene, washed twice with 100 parts of water and the benzene solution is dried over anhydrous sodium sulfate. The benzene and the unreacted amine are removed by distillation at about 15 mm. Hg pressure and the unreacted salicylaldehyde is removed by distillation at about 1 mm. Hg pressure. The residual orange liquid (20.9 parts) is soluble in methanol, isopropanol, acetone, benzene, kerosene, gasoline and hexane.

Basic nitrogen equivalent weight found _____ 116.0
Calculated for $C_{21}H_{27}N_3O_2$ _____ 117.6

*Example V.* — *N,N-bis-(salicylidene-2-aminoethyl)-aniline*

11 parts of salicylaldehyde (0.09 mole) are added to a solution of 8.05 parts of N,N-bis-(2-aminoethyl)-aniline (0.045 mole) dissolved in 50 parts by volume of isopropanol. The solution becomes warm and yellwo crystals begin to crystallize spontaneously. The reaction mixture is heated for one hour on the steam bath and is then allowed to cool spontaneously. The yellow precipitated crystals (15 parts) are filtered off and dried. They melt at 114° to 115°.

Basic nitrogen equivalent weight found _____ 195.5
Calculated for $C_{23}H_{25}N_3O_2$ (dibasic to first end point) _____ 193.5

*Example VI.* — *N,N-bis-(salicylidene-2-aminoethyl)-2-ethylhexylamine*

3.4 parts of salicylaldehyde (0.028 mole) are dissolved in 15 parts by volume of isopropanol and added at room temperature while shaking to a solution of 3 parts of N,N-bis-(2-aminoethyl)-2-ethylhexylamine (0.014 mole) in 25 parts by volume of isopropanol. The reaction mixture is then heated for one hour on the steam bath. The isopropanol, unreacted amine and unreacted salicylaldehyde are removed by distillation at reduced pressures (15 to 1.5 mm. Hg). The residual orange liquid (5 parts) is soluble in methanol, isopropanol, acetone, benzene, kerosene, gasoline and hexane.

Basic nitrogen equivalent weight found _____ 143
Calculated for $C_{26}H_{37}N_3O_2$ _____ 141

*Example VII.* — *N,N,N',N'-tetrakis-(α-methylsalicylidene-2-aminoethyl)-ethylenediamine*

1.25 parts of N,N,N',N'-tetrakis-(2-aminoethyl)-ethylenediamine (0.005 mole) are added at room temperature while shaking to 2.9 parts of o-hydroxyacetophenone (0.021 mole) dissolved in 15 parts by volume of isopropanol. The reaction mixture is then heated at reflux for 1½ hours. Excess salicylaldehyde and the isopropanol are removed by distillation at reduced pressures (15 to 1.5 mm. Hg). The residue (2.1 parts) is recrystallized twice from ethanol. The yellow crystals melt at 153°.

Basic nitrogen equivalent weight found _____ 118.7
Calculated for $C_{42}H_{52}N_6O_4$ _____ 117.5

The metal deactivating properties of the compounds of the present invention are confirmed by the following representative test data.

Since the oxidation measurements in the non-polar cyclohexene system is related to oxidation to other non-polar systems (such as rubber, gasoline and other fuels etc., cf. Chalk et al., Nature, vol. 174, page 274 (1954)) the tests were carried out as follows:

10 ml. of cyclohexene solution containing the metal (2 p.p.m. Cu, 10 p.p.m. Fe, 0.3 p.p.m. Co, 1 p.p.m. Mn or 25 p.p.m. Ni) and the metal deactivator [test compound 1: N,N,N',N' - tetrakis - (salicylidene - 2 - aminoethyl)-ethylenediamine, test compound 2: N,N,N',N'-tetrakis-(salicylidene - 3 - amino - propyl) - ethylenediamine, test compound 3: N,N-bis-(salicylidene-2-aminoethyl)-methylamine, test compound 4: N,N-bis-(salicylidene-3-aminopropyl)-methylamine, test compound 5: N,N-bis-(salicylidene-2-aminoethyl)-aniline, test compound 6: N,N - bis - (salicylidene - 2 - aminoethyl) - 2 - ethylhexylamine, (weight ratio metal deactivator/metal=5)] are pipetted into a clean, dry Sligh oxidation flask. The cyclohexene used in the test is freshly distilled and tested just prior to use to insure the absence of peroxides. The flask is flushed with purified oxygen and the system is sealed with a manometer. The flask is placed in a water bath a 60° C. and readings are taken every 15 minutes thereafter until the test is completed. The end of the induction period is then taken as the time preceded and succeeded by a 2 mm. Hg pressure drop in oxygen pressure.

Copper, iron, manganese and cobalt used in the tests are in the form of the soluble naphthenate salts and are certified to have the following composition:

Copper naphthenate, 8% copper, in a petroleum distillate.
Iron naphthenate, 6% iron, in a petroleum distillate.
Cobalt naphthenate, 6% cobalt, in a petroleum distillate.
Manganese naphthenate, 6% manganese, in a petroleum distillate.

The soluble nickel salt used is nickel oleate prepared as follows:

1 mole of reagent grade nickel sulfate is reacted with 2 moles of sodium oleate using 50% ethanol as solvent. The reaction mixture is filtered off from sodium sulfate and the filtrate is evaporated to dryness. The resulting nickel oleate is dissolved in benzene to give a solution of 6% by weight of nickel.

The test compounds were compared with the widely used N,N'-bis-(salicylideneamino)-propane which is marketed as an 80% by weight solution in an organic solvent. The solution has the following properties:

Color—clear, dark amber.
Specific gravity, 25°/25° C _____ 1.075
Molecular weight _____ 282
Pour point °F _____ 0
Viscosity at 100° F _____ 115
Flash point °F. (Tag) _____ 103
Fire point °F. (Cleveland Open Cup) _____ 145

TEST RESULTS

The test compounds 1 to 6 inclusive demonstrate deactivation of metal catalyzed oxidation against more metals than the widely used N,N'-bis-(salicylideneamino)-propane.

In addition to deactivation, all the test compounds show antioxidant activity as well in the above described cyclohexene test. N,N'-bis-(salicylideneamino)-propane shows no such antioxidant effect.

Thus, test compound 1 is a deactivator for copper, iron, cobalt and nickel and shows marked antioxidant activity in the presence of iron and nickel;

Test compound 2 is a deactivator for copper, iron, cobalt, manganese and nickel, and is an antioxidant in the presence of nickel;

Test compound 3 is a deactivator for copper, cobalt, manganese and nickel, and is an antioxidant in the presence of copper and cobalt;

Test compound 4 is a deactivator for copper, cobalt and nickel, and is an antioxidant in the presence of copper;

Test compound 5 is a deactivator for copper, iron, cobalt, manganese and nickel, and is an antioxidant in the presence of iron; and Test compound 6 is a deactivator for copper, iron, cobalt, manganese and nickel, and is an antioxidant in the presence of cobalt.

That the commercially obtainable N,N'-bis-(salicylideneamino)-propane described in U.S. Patent 2,181,121, is actually an oxidation accelerator in the presence of iron and copper, is strikingly demonstrated by the following comparative test with N,N,N',N'-tetrakis-(salicylidene-2-aminoethyl)-ethylenediamine as representative compound of this invention. The test was carried out in the nonpolar cyclohexene system containing copper and iron as outlined further above. The results are given in Table I.

Table I

[Temp.: 60° C. Oxygen pressure: 1 Atm. Induction period: I.P. (mins.).]

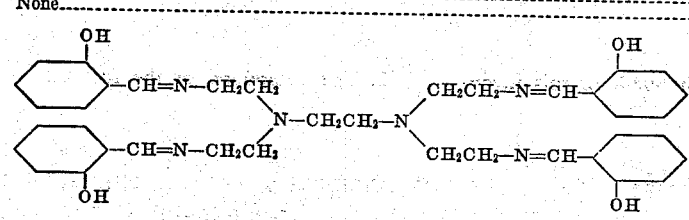

| Compound | Conc., p.p.m. | Cu, p.p.m. | Fe, p.p.m. | I.P., Mins. |
|---|---|---|---|---|
| None | | 2 | 10 | 60 |
| None | | | | 205 |
| (structure shown) | 50 | 2 | 10 | 255 |
| N,N'-bis-(salicylideneamino)-propane | 50 | 2 | 10 | 15 |

It is apparent from these results that N,N,N',N'-tetrakis-(salicylidene-2-aminoethyl)-ethylenediamine according to this invention is an effective deactivator in the presence of both iron and copper together and shows an antioxidant effect in their presence, while the commercially obtainable N,N'-bis-(salicylideneamine)-propane proves to be an oxidation accelerator under the same conditions.

The combined metal deactivators-antioxidants of this invention may be used in motor fuels. More particularly, the use of metal deactivators and antioxidants are frequently required in the stabilization of automotive gasoline. Thus, for example, Federal Specification, Gasoline, Automotive/Motor Fuel M (VV-M-561 a, January 8, 1953) specifically requires that all classes of Regular and Premium Grades of gasoline have an oxidation stability of at least 240 minutes (4 hours) when tested in the A.S.T.M. test D525-55. Representative inhibitors of this invention were dissolved in a commercially available gasoline containing tetraethyl lead, phenylenediamine type antioxidant, rust inhibitor, dye and 1 part per million of dissolved copper. The formulated gasoline was then tested to determine compliance with the oxidation stability requirement of Federal Specification VV-M-561 a (January 8, 1953). The results are shown in Table II and demonstrate that the formulated gasolines containing the representative compounds of this invention surpass this requirement by a wide margin even when used in small amounts of 5 parts per million.

Table II

| Compound | Conc. p.p.m. | I.P. hours |
|---|---|---|
| None | | 1¾ |
| [(⌬(OH)-CH=NCH₂CH₂)₂NCH₂]₂ | 5 | >6½ |
| [(⌬(OH)-C(CH₃)=NCH₂CH₂)₂NCH₂]₂ | 5 | >6½ |
| CH₃N(CH₂CH₂N=CH-⌬(OH))₂ | 5 | 5¼ |
| CH₃N(CH₂CH₂CH₂N=CH-⌬(OH))₂ | 5 | 5½ |

In specific applications, the compounds of this invention act as combined metal deactivators and antioxidants. This combination effect, not exhibited by the commercially available N,N-bis-(salicylideneamine)-propane, is of technical importance and also of economic interest since it eliminates the need for all or part of the normally required antioxidant used in the stabilization of organic materials, such as fats, hydrocarbons, gasoline, lubricants, waxes, etc., as well as in synthetic rubbers, polyethylene, polypropylene and other polymers. It is also within the scope of this invention that mixtures of the chemical compounds described be used to achieve enhanced metal deactivation effects and/or enhanced combination deactivation and antioxidant effects.

In specific applications, the compounds of this invention may be used along with other addivities such as antioxidants, pour point depressants, antiknock additives, rust inhibitors, dyes and pigments, stabilizers, detergents, chemicals used in rubber formulation etc. The amount of the compounds to be used will depend on the specific application and economic consideration.

What we claim is:

1. A compound of the formula

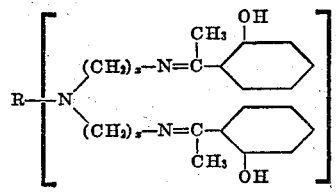

wherein R represents a member selected from the group consisting of alkyl having from 1 to 12 carbon atoms, phenyl and

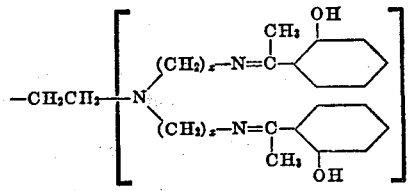

and $x$ represents an integer from 2 to 3 inclusive.

2. The compound of the formula

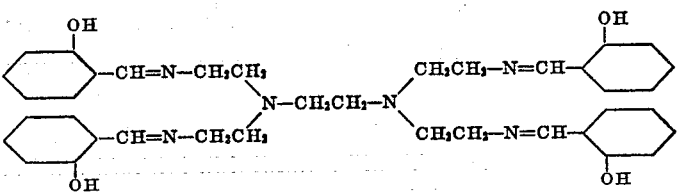

3. The compound of the formula

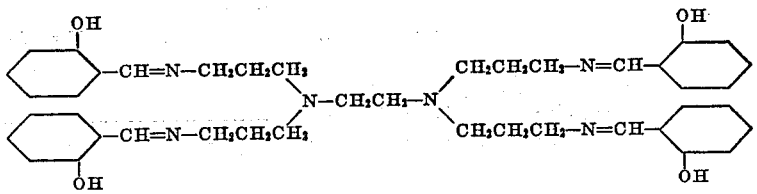

4. The compound of the formula

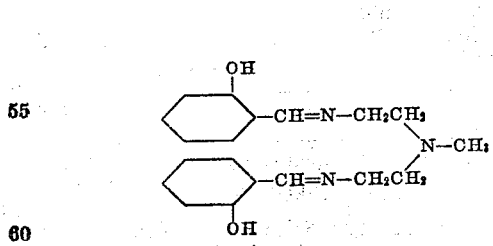

5. The compound of the formula

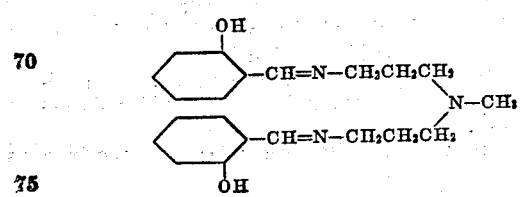

6. The compound of the formula
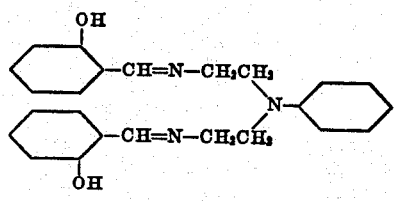
7. The compound of the formula
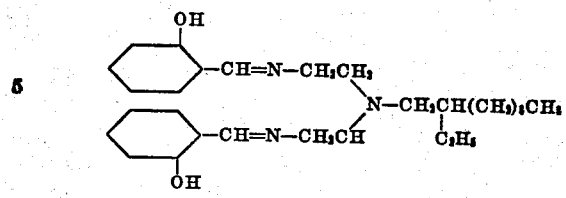
8. The compound of the formula
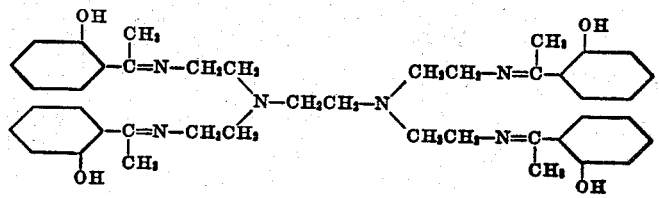
References Cited in the file of this patent
UNITED STATES PATENTS
| | | |
|---|---|---|
| 2,181,122 | Downing et al. | Nov. 28, 1939 |
| 2,301,861 | Downing et al. | Nov. 10, 1942 |
| 2,426,206 | Hamilton et al. | Aug. 26, 1947 |
| 2,533,205 | Chenicek | Dec. 12, 1950 |
OTHER REFERENCES
Bailes et al.: J.A.C.S., vol. 69, pages 1889–1892 (1947).
Das Sarma et al.: J.A.C.S., vol. 77, pages 5476–78 (1955).
Clark et al.: J. Chem. Soc., page 3435 (1955).